United States Patent
Gilles

(10) Patent No.: US 8,898,024 B2
(45) Date of Patent: Nov. 25, 2014

(54) DETERMINATION OF A CAPACITY OF A MOTOR VEHICLE HYDRAULIC PUMP

(75) Inventor: Leo Gilles, Koblenz (DE)

(73) Assignee: Lucas Automotive GmbH, Koblenz (DE)

(*) Notice: Subject to any disclaimer, the term of this patent is extended or adjusted under 35 U.S.C. 154(b) by 491 days.

(21) Appl. No.: 12/989,110

(22) PCT Filed: Feb. 19, 2009

(86) PCT No.: PCT/EP2009/001196
§ 371 (c)(1),
(2), (4) Date: Dec. 10, 2010

(87) PCT Pub. No.: WO2009/129883
PCT Pub. Date: Oct. 29, 2009

(65) Prior Publication Data
US 2011/0112774 A1    May 12, 2011

(30) Foreign Application Priority Data
Apr. 24, 2008 (DE) .......................... 10 2008 020 566

(51) Int. Cl.
*G01L 7/00* (2006.01)
*B60T 17/22* (2006.01)
*B60T 13/66* (2006.01)
*B60T 8/40* (2006.01)

(52) U.S. Cl.
CPC ............... *B60T 17/22* (2013.01); *B60T 13/662* (2013.01); *B60T 8/4059* (2013.01)
USPC ............... 702/50; 702/113; 702/114; 303/11; 303/122.12

(58) Field of Classification Search
CPC ..... B60T 8/4059; B60T 17/22; B60T 13/662; B60T 8/344; B60T 8/4872; B60T 17/221; B60K 7/0015

USPC ............... 702/33, 45, 50, 100, 114, 113, 183; 303/146, 10, 11, 114.1, 115.5, 122.12
See application file for complete search history.

(56) References Cited

U.S. PATENT DOCUMENTS 5,297,527 A * 3/1994 Suzuki et al. ................. 123/520
6,132,010 A * 10/2000 Holt et al. ....................... 303/11
(Continued)

FOREIGN PATENT DOCUMENTS

DE    4439890 A1    5/1996
DE    19638196 A1   7/1997
(Continued)

OTHER PUBLICATIONS

Machine translation of WO2006131368.*

(Continued)

*Primary Examiner* — Sujoy Kundu
*Assistant Examiner* — Harun Chowdhury
(74) *Attorney, Agent, or Firm* — MacMillan, Sobanski & Todd, LLC

(57) ABSTRACT

A method for determining a lack of capacity of a pump, actuated by an electric motor, of a hydraulic brake system of a motor vehicle comprises the steps of generating a hydraulic pressure in a first brake circuit of the brake system by means of a plurality of pump elements of the pump that are assigned to the first brake circuit, limiting the generated hydraulic pressure to a test pressure and simultaneously acquiring a motor-related parameter, and determining a lack of capacity of at least one of the pump elements on the basis of a comparison of the parameter with a comparison value.

13 Claims, 4 Drawing Sheets

(56) References Cited

U.S. PATENT DOCUMENTS

| | | | |
|---|---|---|---|
| 6,132,012 A * | 10/2000 | Ishii | 303/122.12 |
| 6,238,019 B1 * | 5/2001 | Okazaki et al. | 303/146 |
| 6,705,683 B2 | 3/2004 | Niepelt et al. | |
| 2009/0299597 A1 | 12/2009 | Heller et al. | |

FOREIGN PATENT DOCUMENTS

| | | | |
|---|---|---|---|
| DE | 19744522 A1 | 4/1999 | |
| DE | 102005026740 A1 | 12/2006 | |
| WO | 0172568 A1 | 10/2001 | |
| WO | WO2006131368 | * | 12/2006 |

OTHER PUBLICATIONS

Original publication of WO2006131368.*

S. Ilango, Introduction to hydraulics and pneumatics, 2007, Prentice Hall.*

* cited by examiner

DETERMINATION OF A CAPACITY OF A MOTOR VEHICLE HYDRAULIC PUMP

CROSS-REFERENCE TO RELATED APPLICATIONS

This application is a national stage of International Application No. PCT/EP2009/001196 filed Feb. 19, 2009, the disclosures of which are incorporated herein by reference in entirety, and which claimed priority to German Patent Application No. 10 2008 020 566.4 filed Apr. 24, 2008, the disclosures of which are incorporated herein by reference in entirety.

BACKGROUND OF THE INVENTION

The invention relates to a motor vehicle brake system. In particular, the invention relates to the generation of pressure in a hydraulic motor vehicle brake system.

In motor vehicles that are equipped with hydraulic brake systems, hydraulic pumps are used to build up a hydraulic brake pressure independently of the driver. Usually in such cases a drive, for example an electric motor, actuates a plurality of pump elements of a pump that are assigned to differing brake circuits of the motor vehicle. Determination of a defect at one of the pump elements is not difficult, provided that only one pump element is used for each brake circuit. If one of the pump elements is lacking in capacity because of a defect, no further brake pressure whatsoever can be built up in the assigned brake circuit independently of the driver, and the effects of the defect are immediately evident through a failure of the respective brake circuit.

Advanced brake systems require hydraulic pumps that are particularly powerful and whose hydraulic pressure has a more constant characteristic than would be achievable with a single pump element per brake circuit. Therefore pumps that have two or more pump elements per brake circuit are already being used.

If one of the pump elements in such a 4-piston or 6-piston hydraulic pump is lacking in capacity, for example because of a leakage, because of worn components of the pump element or because of another defect, a lack of capacity of the pump as a whole might perhaps become apparent only when a high pressure has to be generated over a relatively long period of time. Travel states of the motor vehicle in which such demands are made on the hydraulic pump include, for example, braking operations in case of hazard. In order to prevent a situation in which a lack of capacity of the hydraulic pump becomes evident only through a lack of effectiveness of the brake system of the motor vehicle during such a vehicle state, it is necessary to check the capacity of the individual pump elements that build up the brake pressure.

Hydraulic pressure sensors, in particular those of high quality that are required for high-grade brake systems, are cost intensive and increase the number of safety-relevant components in the brake system (and, consequently, potentially the probability of a defect). The invention is therefore based on the feature of providing a method by means of which a capacity of pump elements of a pump can also be determined without pressure sensors if necessary (e.g. in the case of saving or failure of the pressure sensor).

BRIEF SUMMARY OF THE INVENTION

According to a first aspect, there is provided a method for determining a lack of capacity of pump, actuated by an electric motor, of a hydraulic brake system of a motor vehicle, which method comprises the steps of generating a hydraulic pressure in a first brake circuit of the brake system by means of a plurality of pump elements of the pump that are assigned to the first brake circuit, limiting the generated hydraulic pressure to a test pressure and simultaneously acquiring a motor-related parameter, and determining a lack of capacity of at least one of the pump elements on the basis of a comparison of the parameter with a comparison value.

The motor-related parameter can be, for example, a current consumption, or power consumption, a rotational speed or an after-run behaviour of the electric motor. The parameter can also relate to a characteristic of these or other quantities as a function of time. If the determination includes the ascertainment of whether the parameter deviates from the comparison value by more than a predefined quantity, a difference between the parameter and the comparison value can be ascertained through a comparison of this parameter with a threshold value.

The test pressure can be, for example, a pressure that is greater than a pressure to be generated in the normal braking operation, in order that a small defect, which does not yet endanger the braking operation, can be determined beforehand. The test pressure can be a fixedly predefined value. Further, the test pressure can be predefined in a situation-related manner, on the basis of further parameters, for example on the basis of a distance travelled by the motor vehicle since a previous execution of the method, a past outcome of the method, or another parameter related to the motor vehicle.

The comparison value can be selected so as to be fixed. For example, the comparison value can be stored in the form of a value. The comparison value can also be determined through a design of a comparison element (e.g. a fixed electrical resistance). Alternatively, or additionally thereto, the comparison value can, for example, be correlated parametrically with the test pressure.

Alternatively thereto, the comparison value can be a second motor-related parameter that is acquired while a brake pressure is limited to the test pressure that is generated in a second brake circuit of the motor vehicle by means of a plurality of pump elements of the pump that are assigned to the second brake circuit. For example, the pump can be constructed symmetrically in respect of two brake circuits and, in the case of full capacity of all pump elements being present, the motor-related parameter in the case of generation of a hydraulic pressure in the first brake circuit that is limited to the test pressure can correspond to the motor-related parameter in the case of generation of a pressure in the second brake circuit that is limited to the test pressure.

The comparison value can be a value of the first and/or second motor-related parameter that is determined at an earlier point in time. In this case, the comparison value can relate to the same or a different brake circuit.

The first and/or the second motor-related parameter can each indicate a time span. For example, it can indicate a time span that passes until a current consumption, or power consumption, a rotational speed or an after-run behaviour of the electric motor attains or exceeds a predefined value or range, or until a rate of change of such a value exceeds or falls below a predefined value. The time span can commence, for example, with a starting of the electric motor.

The limiting of a hydraulic pressure in a brake circuit can be effected by means of a discharge valve assigned to the brake circuit. For this purpose it is possible to use, for example, a valve arrangement that can be controlled electrically, in which the pressure difference at which the valve arrangement changes over automatically into its flow position, the pressure difference being determinant for the pressure limitation function, can be set via the electrical control. Such a valve arrangement is disclosed, for example, in DE 44 39 890 C2, and corresponding U.S. Pat. No. 6,120,003. A pulse width modulation (PWM), whose pulse-no-pulse ratio can be set, can be used, in known manner, as an electrical control. An electrical control of such a valve arrangement, to the effect of a discharge feedback control, is described, for example, in DE 10 2005 026 740 A1, and corresponding U.S. Patent Application Publication No. 2009/299597 A1.

The method can further comprise the step of determining a stable vehicle state of the motor vehicle and subsequently executing the described method in the stable vehicle state. A vehicle state can comprise, for example, a state of motion (velocity, direction of motion and acceleration) of the motor vehicle. A stable vehicle state can be identified, for example, in the case of an identified standstill of the vehicle and, simultaneously, the ignition having been switched off or only just having been switched on.

Further, the method can comprise the step of actuating a hydraulic valve that hydraulically separates at least one wheel brake from the pump. For example, a hydraulic pressure at the wheel brake can be purposefully built up or let down before the valve is closed and the method set out above is executed. In this way, the wheel brakes that are not involved in the determination of the capacity of the pump cannot affect a result of the method. Moreover, in this way, the motor vehicle can be kept in a stable vehicle state during the execution of the method.

According to a second aspect, there is provided a computer program product having program code means for executing the method described above when the computer program product runs on a processing unit (e.g. an electric control unit, also termed ECU). Such a processing unit can control further brake functionalities of the motor vehicle, for example ABS, ESP, a parking brake control, etc.

The computer program product can be stored on a computer-readable data medium. For example, the computer program product can be stored on a portable data medium such as, for example, a diskette, hard disk, CD or DVD, or on a fixed data medium such as, for example, a semiconductor memory (for instance, a RAM, ROM, EPROM, EEPROM, NOVRAM or FLASH).

According to a third aspect, there is provided a device for determining a lack of capacity of a pump, actuated by an electric motor, of a hydraulic brake system of a motor vehicle, the device comprising a pressure generating device for generating a hydraulic pressure in a first brake circuit of the brake system by means of a plurality of pump elements of the pump that are assigned to the first brake circuit, a first limiting device for limiting the hydraulic pressure to a test pressure, an acquisition device for simultaneously acquiring a first motor-related parameter, and a determination device for determining a lack of capacity of at least one of the pump elements on the basis of a comparison of the parameter with a comparison value.

The acquisition device can acquire, for example, a consumed current, or a consumed power, a rotational speed or an after-run behaviour of the electric motor. The determination device can be connected to an output device, which signals a lack of capacity of the pump. The output device can comprise, for example, optical and/or acoustic signal elements. Additionally or alternatively thereto, for example, an output can be effected into a memory, for instance into a non-volatile fault memory of the motor vehicle for read-out during subsequent service work.

The device can further comprise a second limiting device for limiting a hydraulic pressure generated by means of a plurality of pump elements of the pump that are assigned to a second brake circuit. The second limiting device can be realized to limit the hydraulic pressure to the test pressure.

The pump elements can comprise cylinder-piston units. Each cylinder-piston unit can comprise at least one cylinder, a piston guided therein and appropriate sealing elements. In particular, the pistons can be distributed, for example radially, around an eccentric arrangement that is coupled to the electric motor in a rotationally fixed manner. The distribution of the pump elements can also (if appropriate, additionally) comprise a distribution along an axial direction of the eccentric arrangement.

The limiting device can comprise a hydraulic discharge valve. The discharge valve can be electrically controllable, in order to limit a hydraulic pressure in a brake circuit to a predetermined pressure. For example, control by means of an analogue or digital signal, for instance a PWM signal, is possible. In further embodiments, the discharge valve can be settable, for example by means of a motor actuator or, also, by other means.

The device can comprise a valve for hydraulically separating at least one wheel brake from the pump. The valve can also, for example, be a constituent part of an ABS system. A wheel-specific valve can be provided for hydraulically separating the wheel brake from the pump; alternatively or additionally thereto, a central non-return valve can also be provided, for example at a connector of the pump, which connector is connected to a brake circuit and realized to hydraulically separate a plurality of wheel brakes from the pump.

Other advantages of this invention will become apparent to those skilled in the art from the following detailed description of the preferred embodiments, when read in light of the accompanying drawings.

Figure 1:
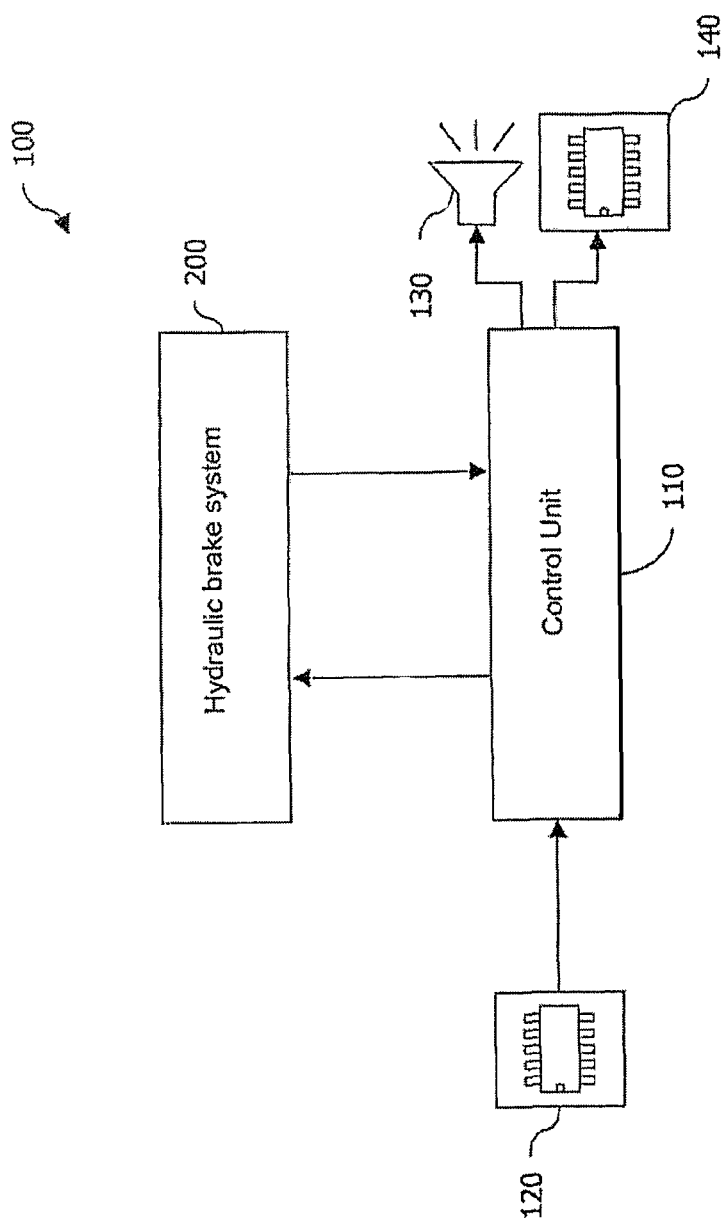
FIG. 1 shows a schematic overview of a hydraulic motor vehicle brake system.

Elements corresponding to one another in the drawings are denoted by corresponding references.

DETAILED DESCRIPTION OF THE INVENTION

FIG. 1 shows an overview of an embodiment of a hydraulic brake system 100 of a motor vehicle. The brake system 100 comprises a hydraulic brake system 200, a control unit (ECU) 110, a memory 120, an output device 130 and a fault memory 140. The control unit 110 and the hydraulic brake system 200 are electrically connected to each other. In addition, the control unit 110 is connected to the memory 120 for the purpose of reading, and is connected to the fault memory 140 for the purpose of writing. Moreover, the control unit 110 is connected to the output device 130 for the purpose of outputting results.

Figure 2:
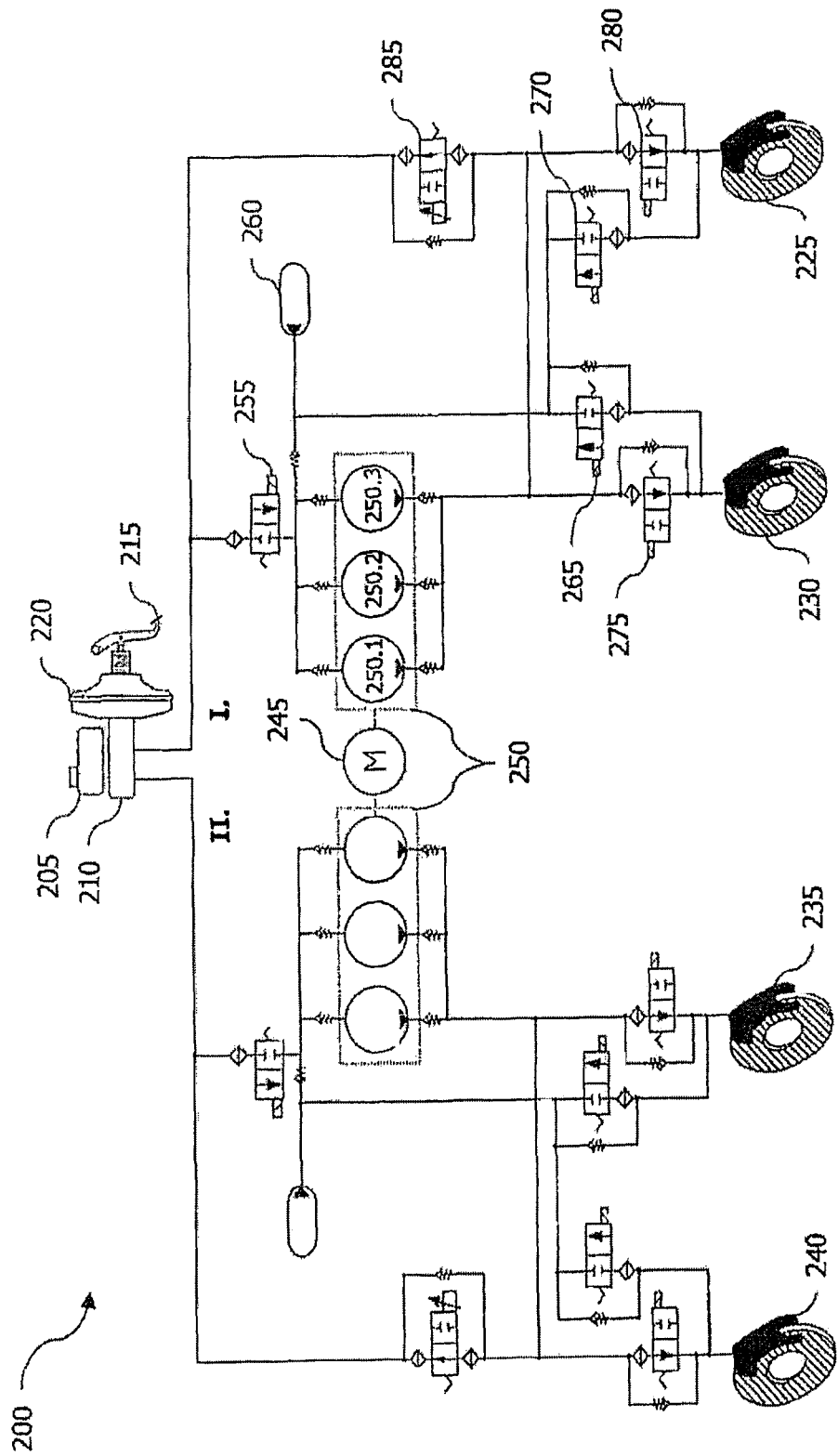
FIG. 2 shows a hydraulic circuit diagram of a hydraulic brake system of the motor vehicle brake system of FIG. 1.

FIG. 2 shows a hydraulic circuit diagram of the hydraulic brake system 200 from FIG. 1. The brake system 200 comprises a container 205 for holding hydraulic fluid, a main brake cylinder 210, a brake pedal 215, a brake booster 220 and two brake circuits I. and II., which act on wheel brakes 225 to 240 and which are substantially identical in their structure, for which reason only the first brake circuit I. is described more fully in the following. An electric motor 245, and a 6-piston pump 250 that is actuated by the electric motor 245, are assigned to the two brake circuits I. and II. together. Further, the first brake circuit I. comprises an intake valve 255, a pressure accumulator 260, electrically controllable ABS valves 265 to 280, which are assigned to the wheel brakes 225 and 230, and an electrically controllable discharge valve 285.

A hydraulic pressure for actuating the wheel brakes 225 and 230 can be generated by the driver, by means of the elements 205 to 220, or independently of the driver, by means of the pump 250. The pump 250 comprises six pump elements, which are arranged in a common housing and of which the three pump elements 250.1 to 250.3 are assigned to the first brake circuit I. Each of the pump elements 250.1 to 250.3 comprises a cylinder, a piston guided therein and appropriate sealing elements (not represented).

The discharge valve 285 limits a hydraulic pressure generated for the purpose of building up braking forces in the wheel brakes 225 and 230. By means of electric control, the discharge valve 285 can be changed over into a flow position or into a blocking position. In the blocking position, the discharge valve 285 changes over automatically into the flow position as soon a pressure difference between its hydraulic connectors, which is determinant for the pressure limitation function of the discharge valve 285, exceeds an electrically settable value. In this way, a setpoint pressure can be set in the brake circuit I.

Usually, the ABS valves 265 to 280, the intake valve 255 and the discharge valve 285 are operated in the context of a safety-relevant braking intervention (not shown), such as an ESP intervention. Through appropriate control of the ABS valves 265 to 280, it is possible for the hydraulic pressure prevailing in the wheel brakes 225 and 230 to be increased, held and reduced in a wheel-specific manner. In the case of braking pressure being generated independently of the driver, for example in ESP operating mode, the pump 250 is activated through switching-on of the electric motor 245. The intake valve 255 is set in such a way that the hydraulic fluid can be sucked out of the main brake cylinder 210 by the pump 250. The discharge valve 285 is set in such a way that the pressure required for the ESP-regulated pressure setting in the wheel brakes 225 and 230 can be set.

Figure 3:
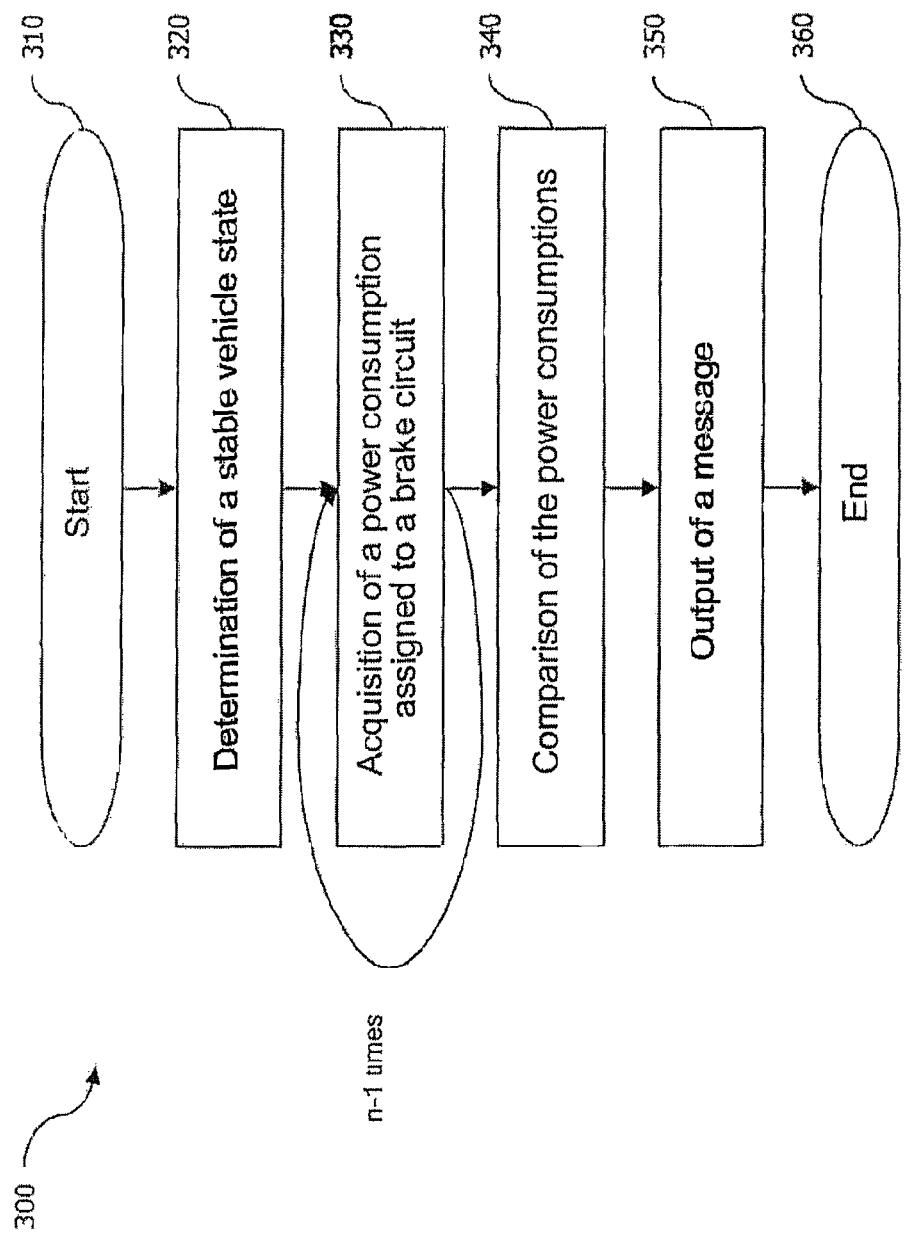
FIG. 3 shows a flow diagram of a method for determining a capacity of a pump of a motor vehicle brake system according to FIG. 2.

FIG. 3 shows a flow diagram 300 of a method for determining a capacity of the pump 250 in the hydraulic motor vehicle brake system 200 according to FIG. 2.

The method is in an initial state, in a step 310. In a succeeding step 320, a stable vehicle state is determined. This can be a state of standstill of the motor vehicle with the ignition switched off, for example after parking or before starting of a drive motor. Alternatively thereto, the method can also be continued after switching-on of the ignition, but before starting of the engine. A further alternative would be to execute the method in a stable travel state (e.g. at low speeds). In this case, it is necessary for the wheel brakes 225, 230 to be hydraulically decoupled from the pump 250 by means of the ABS valves 265 to 280. If a stable vehicle state cannot be determined, the method remains in step 320, in order not to jeopardize operational safety of the motor vehicle during checking of the capacity.

If a stable vehicle state has been determined, the electric motor 245 is switched on in a succeeding step 330, and a power consumption of the electric motor 245, which is assigned to a test pressure within the first brake circuit, here the brake circuit I. from FIG. 2, is acquired. For this purpose, the discharge valve 285 is set in such a way that the hydraulic pressure at the output of the pump elements 250.1 to 250.3 is limited to a value that is above a hydraulic pressure normally used during operational braking, for example 60 to 80 bar. In order to reduce influencing of the method by the wheel brakes 225 and 230, the valves 265 and 280 are closed in addition.

In parallel therewith, the valves of the brake circuit II. are controlled in such a way that the pump elements assigned to the brake circuit II. oppose the electric motor 245 with a minimal mechanical resistance, in order that the power consumption of the electric motor 245 correlates as strongly as possibly with a generation of pressure in the first brake circuit I. For this purpose, the valve of the brake circuit II. that corresponds to the discharge valve 285 is set to a least possible pressure (for example, 1 bar or less), and the ABS valves of the brake circuit II. that correspond to the valves 265 to 280 are closed.

Should one of the pump elements 250.1 to 250.3 assigned to the brake circuit I. have only a limited capacity, the pressure of, for example, 70 bar limited by means of the discharge valve 285 is not attained in the brake circuit I., and the mechanical resistance with which the pump 250 as a whole opposes the electric motor 245 is less than in the case of a full capacity of all pump elements. Accordingly, a power consumption of the electric motor 245 is also less than in the case of the generation of the predetermined pressure of 70 bar, this resulting in a comparatively lesser current consumption of the electric motor 245.

This procedure of step 330 is performed in succession for each of the brake circuits of the brake system 200, such that finally an assigned power consumption exists for each brake circuit.

In a step 340, the thus determined power consumptions are compared with one another. In this case, a lack of capacity of at least one pump element in one of the brake circuits is identified if the power consumption assigned to this brake circuit is less than a power consumption assigned to another brake circuit. A difference between power consumptions that are assigned to differing brake circuits can also be compared with a threshold value, in order to prevent incorrect determinations. A threshold value can be specified in absolute terms (e.g.: 3 bar or 10 bar) or in relative terms (for example, 5% or 10% of the greater value). Both the threshold value and comparison values for the power consumption of the electric motor are stored in the memory 120, from which they are read by the control unit 110.

In a step 350, a result of the comparison from the step 340 is then output in the form of a driver signal, by means of the output device 130, and/or stored in the form of an entry in the fault memory 140 (cf. FIG. 1). Optionally, at this point in time, a value determined in step 330 for the power consumption of the electric motor can also be stored in the memory 120, for a subsequent comparison.

Figure 4:
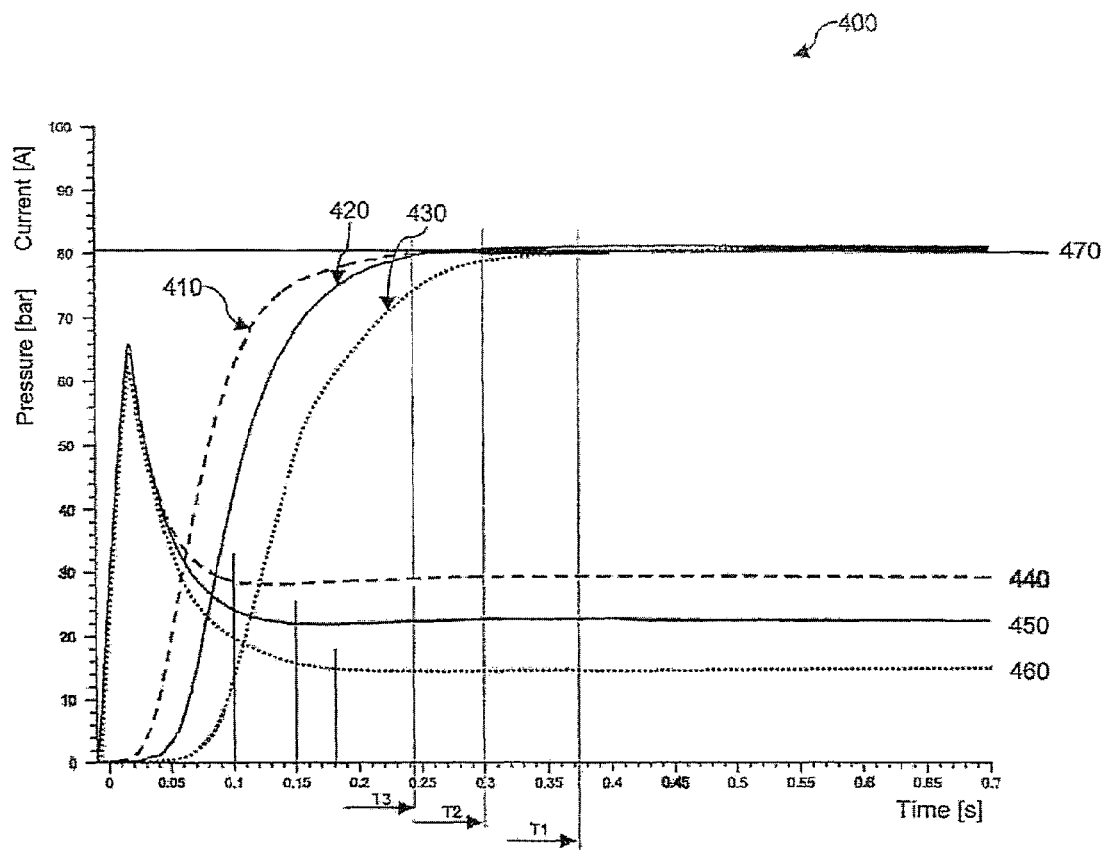
FIG. 4 shows, as a function of time, characteristics of hydraulic pressures and motor-related parameters in the hydraulic brake system of FIG. 2.

FIG. 4 shows, as a function of time, a graphic representation 400 of characteristics of hydraulic pressures 410, 420 and 430 in the brake circuit I. of the hydraulic brake system of FIG. 2 and characteristics 440, 450 and 460 of current consumptions of the electric motor 245. The horizontal axis is the time axis and the vertical axis denotes a pressure or a power consumption. The horizontal line 470 represents the hydraulic test pressure, or limit pressure, of approximately 80 bar set through the discharge valve 285.

The pressure characteristic 410 corresponds to a situation in which all three pump elements 250.1, 250.2 and 250.3 are in operating condition. The electric motor 245 in this case consumes the electric current represented in the characteristic 440. The pressure characteristic 420 corresponds to a situation in which one of the pump elements 250.1, 250.2 and 250.3 is not in operating condition; the characteristic 450 of the current consumption of the electric motor 245 is assigned to this pressure characteristic 420. In a situation in which two of the pump elements 250.1, 250.2 and 250.3 are not in operating condition, a pressure characteristic 430 is obtained, to which a characteristic 460 of the current consumption of the electric motor 245 is assigned.

It can be seen that, in the case of three pump elements 250.1 to 250.3 in operating condition, the predefined limit pressure 470 is attained relatively early, namely, at an instant T3. In the case of only two pump elements 250.1 to 250.3 being in operating condition, the same limit pressure 470 is attained by the pressure characteristic 420 only at a later instant T2. In the case of only one pump element 250.1 to 250.3 in operating condition, the pressure characteristic 430 achieves the predefined limit pressure 470 only at an even later instant T1.

The characteristics of the current consumptions 440 to 460 are approximately coincident with one another in an initial region, up to approximately 0.05 sec.; thereafter, at differing speeds, they asymptotically approach differing, substantially constant, continuous current consumptions. From a consideration of the characteristics of the current consumption 440, 450 and 460, a capacity of one, two or all of the piston pump elements 250.1 to 250.3 can be identified either from the level of the current consumption in the state of equilibrium, or from the amount of time that elapses, after switching-on of the electric motor, until the current consumption is substantially unchanging. The course of the current characteristic 440 is substantially constant from approximately 0.1 sec., that of the current characteristic 450 from approximately 0.15 sec., and that of the current characteristic 460 from approximately 0.18 sec. A defective pump element 250.1 to 250.3 can thus be identified from the fact that the current consumption of the electric motor 245 remains substantially constant later than expected after switching-on of the electric motor 245. A determination of when one of the characteristics of the current consumptions 440, 450 and 460 is substantially constant can be made, for example, by means of a differentiation step, or differentiation element.

In a first exemplary development of the invention, a time span, which lies between the switching-on of the electric motor 245 and the attainment of a constant current consumption of the electric motor 245, is used as a motor-related parameter and compared with one or more predetermined (i.e. previously stored or permanently stored) time spans, in order to determine the capacity of the pump elements 250.1 to 250.3. If, with reference to FIG. 4, the determined time span is shorter than approximately 0.1 sec., all three pump elements 250.1 to 250.3 are determined as being in operating condition. If the determined time span is between approximately 0.1 and approximately 0.15 sec., it is determined that one of the pump elements 250.1 to 250.3 is lacking in capacity. In the case of a determined time span of between approximately 0.15 and approximately 0.18 sec., a lack of capacity of two of the pump elements 250.1 to 250.3 is determined.

In a second exemplary development of the invention, the absolute current value in the range of the constant current consumption of the electric motor 245 is used as a motor-related parameter and, for the purpose of determining the capacity of the pump elements 250.1 to 250.3, compared with one or more absolute current values. If, with reference to FIG. 4, the substantially constant current consumption of the electric motor 245 is above approximately 26 A, a capacity of all three pump elements 250.1 to 250.3 is determined. If, on the other hand, the determined current consumption is between approximately 26 A and approximately 18 A, a lack of capacity of one of the pump elements 250.1 to 250.3 is determined, while a current consumption less than approximately 18 A results in the determination of a lack of capacity of two of the pump elements 250.1 to 250.3. The instant from which the current consumption of the electric motor 245 is substantially constant can be determined as described above; alternatively thereto, it is also possible to select a measurement instant at which a substantially constant current consumption can be assumed, for example approximately 0.2 sec. after switch-on.

A hydraulic brake system of a motor vehicle can be controlled, in the described manner, such that a lack of capacity of at least one pump element can be determined. Enlargement of a hydraulic brake system already present, for instance as part of an ABS or ESP system, is not necessary for this purpose. In particular, no pressure sensors need be used for checking the capacity of the pump, although their use in the brake system (e.g. for other purposes) is entirely possible.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for pressure sensor independently determining a lack of capacity of a pump, actuated by an electric motor, of a hydraulic brake system of a motor vehicle, comprising the following steps:
   generating a hydraulic pressure in a first brake circuit of the brake system by means of a plurality of pump elements of the pump that are assigned to the first brake circuit;
   limiting the generated hydraulic pressure by means of a hydraulic discharge valve assigned to the first brake circuit to a test pressure being higher than an operational braking pressure and simultaneously acquiring a first motor-related parameter associated with the provided test pressure; and
   determining a lack of capacity of at least one of the pump elements on the basis of a comparison of the parameter with a comparison value and independently of a pressure sensor.

2. The method according to claim 1, wherein the comparison value is selected so as to be fixed.

3. The method according to claim 1, wherein the comparison value is a second motor-related parameter that is acquired while a hydraulic pressure, which is generated in a second brake circuit of the motor vehicle by means of a plurality of pump elements of the pump that are assigned to the second brake circuit, is limited to the test pressure.

4. The method according to claim 3, wherein the comparison value is a value of the first and/or second motor-related parameter that is determined at an earlier point in time.

5. The method according to claim 3, wherein the first and/or second motor-related parameter each indicate/indicates a time span.

6. The method according to claim 1, further comprising the step of determining a stable vehicle state of the motor vehicle and subsequently executing the steps of generating, limiting and determining in the stable vehicle state wherein the stable vehicle state is a state of motion of the motor vehicle.

7. The method according to claim 1, further comprising the step of actuating a hydraulic valve that hydraulically separates at least one wheel brake from the pump.

8. A computer program product having program code means or executing a method according to claim 1 when the computer program product runs on a processing unit, wherein the computer program product is stored on a non-transitory computer-readable data medium.

9. A device for pressure sensor independently determining a lack of capacity of a pump, actuated by an electric motor, of a hydraulic brake system of a motor vehicle, comprising:
- a pump for generating a hydraulic pressure in a first brake circuit of the brake system by means of a plurality of pump elements of the pump that are assigned to the first brake circuit;
- a first limiting device in the form of a hydraulic discharge valve for limiting the hydraulic pressure to a test pressure being higher than an operational braking pressure;
- an acquisition device for simultaneously acquiring a first motor-related parameter associated with the provided test pressure; and
- a determination device for determining a lack of capacity of at least one of the pump elements on the basis of a comparison of the parameter with a comparison value and independently of a pressure sensor.

10. The device according to claim 9, further comprising a second limiting device for limiting a hydraulic pressure generated by means of a plurality of pump elements of the pump that are assigned to a second brake circuit.

11. The device according to claim 9, wherein the pump elements are cylinder-piston units.

12. The device according to claim 9, further including a valve for hydraulically separating at least one wheel brake from the pump.

13. The device according to claim 9, further comprising a device for determining a stable vehicle state of the motor vehicle, wherein the stable vehicle state is a state of motion of the motor vehicle.

* * * * *